US008339088B2

(12) United States Patent
Bodner et al.

(10) Patent No.: US 8,339,088 B2
(45) Date of Patent: Dec. 25, 2012

(54) MOTOR ARRANGEMENT

(75) Inventors: Rudolf Bodner, Steinfeld (DE); Helmut Kunkel, Wiesthal (DE)

(73) Assignee: Robert Bosch GmbH, Stuttgart (DE)

( * ) Notice: Subject to any disclaimer, the term of this patent is extended or adjusted under 35 U.S.C. 154(b) by 473 days.

(21) Appl. No.: 12/593,839

(22) PCT Filed: Mar. 20, 2008

(86) PCT No.: PCT/EP2008/002262
§ 371 (c)(1),
(2), (4) Date: Dec. 2, 2009

(87) PCT Pub. No.: WO2008/119477
PCT Pub. Date: Oct. 9, 2008

(65) Prior Publication Data
US 2010/0072931 A1   Mar. 25, 2010

(30) Foreign Application Priority Data
Mar. 29, 2007  (DE) .......................... 10 2007 015 102

(51) Int. Cl.
*H02P 3/00*  (2006.01)
(52) U.S. Cl. .................. 318/474; 318/611; 318/568.22; 700/278.19
(58) Field of Classification Search .............. 318/30–40, 318/80–90, 568.22, 611, 474; 700/278, 19, 700/278.19
See application file for complete search history.

(56) References Cited

U.S. PATENT DOCUMENTS

| | | | |
|---|---|---|---|
| 4,527,247 A * | 7/1985 | Kaiser et al. | 700/278 |
| 4,742,475 A * | 5/1988 | Kaiser et al. | 700/278 |
| 4,916,642 A * | 4/1990 | Kaiser et al. | 700/278 |
| 4,994,986 A * | 2/1991 | Cihiwsky et al. | 358/1.14 |
| 6,434,512 B1 * | 8/2002 | Discenzo | 702/184 |
| 6,507,165 B2 * | 1/2003 | Kato et al. | 318/611 |
| 6,757,665 B1 * | 6/2004 | Unsworth et al. | 706/15 |
| 7,389,278 B2 * | 6/2008 | Unsworth et al. | 706/23 |
| 2001/0033146 A1 * | 10/2001 | Kato et al. | 318/568.22 |
| 2003/0171827 A1 * | 9/2003 | Keyes et al. | 700/19 |
| 2004/0199480 A1 * | 10/2004 | Unsworth et al. | 706/16 |
| 2006/0142875 A1 * | 6/2006 | Keyes et al. | 700/1 |
| 2007/0289635 A1 * | 12/2007 | Ghazarian et al. | 137/312 |
| 2009/0062931 A1 * | 3/2009 | Keyes et al. | 700/7 |
| 2009/0160387 A1 * | 6/2009 | Terorde | 318/474 |

* cited by examiner

*Primary Examiner* — Paul Ip
(74) *Attorney, Agent, or Firm* — Lathrop & Gage LLP

(57) ABSTRACT

The invention relates to a motor arrangement (1) comprising a motor (4) on which a transmitter device (6) is arranged, a regulating device (2) which is spatially separated from the motor, communicates with the motor (4) via at least one motor line/connection line (10), and controls the movement of the motor, and at least one sensor device (8) which is arranged on the motor (4), detects at least one physical property of the motor, and emits a signal characterising said physical property, the transmitter device (6) being connected to the regulating device (2) via the connection line. According to the invention, there is a direct communication connection (9) between the sensor device (8) and the transmitter device (6), by which means the sensor device (8) transmits the characteristic signal directly to the transmitter device (6).

10 Claims, 2 Drawing Sheets

MOTOR ARRANGEMENT

CROSS-REFERENCE TO RELATED APPLICATIONS

This application claims priority to PCT/EP2008/002262, filed 20 Mar. 2008, which in turn claims priority to German Patent Application No. 102007015102.2, filed 29 Mar. 2007.

FIELD

The present invention relates to a motor arrangement.

BACKGROUND

Such motor arrangements have been long known according to prior art. For this purpose, it is particularly known that in addition to the motor itself, such motor arrangements usually have a motor transmitter being arranged on the motor, and a control and/or analysis device, which controls the movement of the motor. Said analysis device is usually connected to the motor via a line or a cable. More precisely, a plurality of cables is usually necessary, which are guided to the motor via the control/analysis device, such as a power cable and a plurality of control cables, or control wires.

Motor transmitter systems are also known, wherein the transmitters of the motors utilize positioning, speed, and acceleration values for controlling the motor. For this purpose the respective positioning, speed, and acceleration values are transmitted to the evaluation electronics also via control cables, and the evaluation electronics performs controls as a response to the valued measured at the motor. Altogether, the result is a very high expenditure of cables, since the power, sensor, and transmitter signals are usually installed in dedicated cables each. More precisely, twice or multiple times of the cable conduits are therefore necessary, and also twice the amount, or at least an increased amount of plugs and cables. Additionally, wider cable hauling devices are necessary in machines, and also an increased installation space.

SUMMARY

The present invention is therefore based on the object of reducing the cabling expenditure between the transmitter system and the evaluation electronics, and particularly also to reduce the amount of necessary plugs and cables, or lines, respectively. More precisely, the expenditure with regard to material and costs for the communication between the transmitter system and the analysis electronics is to be reduced overall.

The same is achieved according to the invention by means of a motor arrangement according to claim 1, and an electric connection line according to claim 19.

Advantageous embodiments and further improvements are the object of the dependent claims.

The motor arrangement according to the invention comprises a motor on which a transmitter device is arranged. Also, a regulating device being spatially separated from the motor, is provided, which communicates with the motor via at least one motor line, and controls the movement of the motor. Additionally, at least one sensor device being arranged on the motor is provided, which detects at least one physical property of the motor, or the movement thereof, and emits a signal characterizing said physical property. For this purpose the transmitter device is connected to the control device, preferably via a connection line, and particularly preferred also via the motor line.

According to the invention there is a direct communication connection between the sensor device and the transmitter device, by means of which the sensor device transmits the characteristic signal directly to the transmitter device.

A physical property of the motor, or the movement thereof, generally means all properties by means of which the motor, or the movement thereof, may be characterized, such as a temperature of the motor, a torque of the motor, a position of the rotor shaft, or rotor, and the like. Externally introduced physical variables may also be detected and processed, such as impacts, vibrations, or the like.

According to the invention the transmitter system, or the transmitter device, respectively, is therefore utilized as a central control device for evaluating external sensors. While the signals of the sensors and the transmitter signals are currently each guided to the regulating device in dedicated cables, as mentioned above, the invention provides that part of the signals, such as the evaluation of external sensors, is carried out via the transmitter interface. Therefore, said external sensors do not need to be guided to the evaluation electronics that is spatially separated from the motor. In this manner the amount of signal lines necessary can be significantly reduced, and it is particularly possible to install the signal lines directly into power cables. The transmitter device therefore acts as a central control unit according to the invention, in which the signals of the individual sensor devices are combined. Additionally, devices may also be provided, or installed, respectively, in order to detect, evaluate, and store information on preventive maintenance.

Preferably, the transmitter device has a processor device, which is configured such that an output signal is transmitted to the regulating device in response to the characteristic signal coming from the sensor device. The regulating device may in turn activate the motor accordingly in response to said output signal. The cabling expenditure between the motor and the regulating device can therefore be reduced significantly.

Preferably, the motor arrangement comprises a plurality of sensor devices, wherein the individual sensor devices are each connected to the transmitter unit via sensor lines, or some mutual lines, or via mutual communication with each other. In this manner the transmitter device is utilized as a central control device in this embodiment, which processes a plurality of sensor signals.

Preferably, the sensor device is selected from a group of sensor devices, which contains temperature sensor devices, position sensor devices, speed sensor devices, power sensor devices, acceleration sensor devices, combinations thereof, and the like. An exact control of the motor can be carried out by means of said various sensor devices.

In another advantageous embodiment at least one sensor device bi-directionally communicates with the transmitter device. It is also possible, for example, that the transmitter device transmits signals vice versa to the position sensor or to the temperature sensor as a central control device, which in turn are utilized by the same during the output of signals.

Preferably the motor device has a braking device, which also communicates with the transmitter device. In this manner said braking device is also controlled by the transmitter device, wherein the braking device may also transmit signals vice versa to the transmitter device. Furthermore, a control device may be provided, or integrated, respectively, which, for example, evaluates the braking signals during the activation process in order to draw conclusions on the behavior of the braking device. Constant monitoring of, for example, the braking signals, is possible in order to detect defects upon the occurrence thereof.

Preferably the motor line has three power lines, one ground line (PE) and two control lines. Preferably, the motor and the transmitter device thereof are also arranged in a mutual housing, preferably also having the individual sensor devices. In this manner the cabling expenditures may also be reduced, and safe cable connection can simultaneously be ensured in this manner.

The present invention further relates to an electric connection line for connecting a motor to a regulating device controlling the motor. Said connection line has an exterior shielding, at least three power lines installed within said exterior shielding, which are each enveloped by an electrically insulated sheathing. Furthermore, the invention provides a ground line, and a control line extending within the exterior shielding. According to the invention two control wires are arranged within the control line, which are mutually surrounded by a second sheathing, wherein the second sheathing and the exterior sheathing are insulated against each other, and wherein an electric contacting device is arranged on at least one end of the connection line, which communicates with the second electric sheathing in an electrically conducting manner.

Preferably, the cross-section of at least one sheathing and/or the cross-section of the second shielding are embodied in an irregular manner on at least one end of the connection line, and preferably on both ends. Irregular means in this context that the cross-section of said insulation, or shielding, respectively, has a symmetrical axis at most.

Preferably, said cross-section has at least one protrusion, which protrudes toward the exterior with regard to the sheathing. However, a protrusion protruding toward the interior is also conceivable.

In this manner the second or internal shielding has a dedicated contact, or a dedicated PIN according to the invention.

Further advantages and embodiments are depicted and described with reference to the attached drawings.

DETAILED DESCRIPTION OF THE EMBODIMENTS

Figure 1:
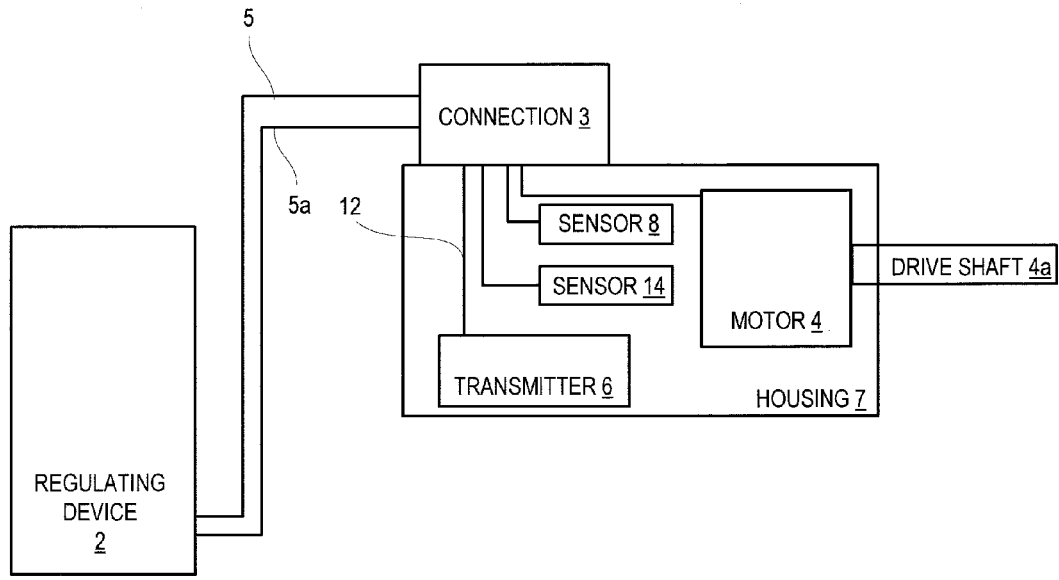
FIG. 1 shows a motor arrangement according to prior art.

FIG. 1 illustrates a prior art motor arrangement. A motor 4 is provided with a drive shaft 4a, wherein the motor 4 is arranged in a mutual housing 7 together with a transmitter 6 and sensor devices 8, 14.

Reference symbol 3 refers to a connection, via which the motor 4 and the individual devices are connected to a regulating device or regulating and analysis device 2 by means of a plurality of connection cables 5, 5a, which controls the motor. For this purpose a plurality of wire is necessary in order to connect the motor 4 to the regulating/analysis device 2. In detail, multiple, for example, four control wires are necessary in addition to three power lines and one ground line in order to control the rotational movements of the motor. Furthermore, the individual sensor devices are each connected via a line 5a for the regulation using the regulating/analysis device 2 (hereinafter referred to as regulating device), and a plurality of control wires, such as ten control wires, is again necessary in order to connect all sensors to the regulating/analysis device.

Therefore, prior art requires a substantial expenditure of cables, and accordingly, extensive plug-in connectors must also be provided. Furthermore, such plug-in connectors and cable connectors often represent a frequent source of errors, since, for example, the plug-in connectors can be stressed by exterior influences, such as impacts. Such exterior plug-in contacts are also subjected to exterior influences to a greater degree, thus to a higher degree of wear and tear.

Figure 2:
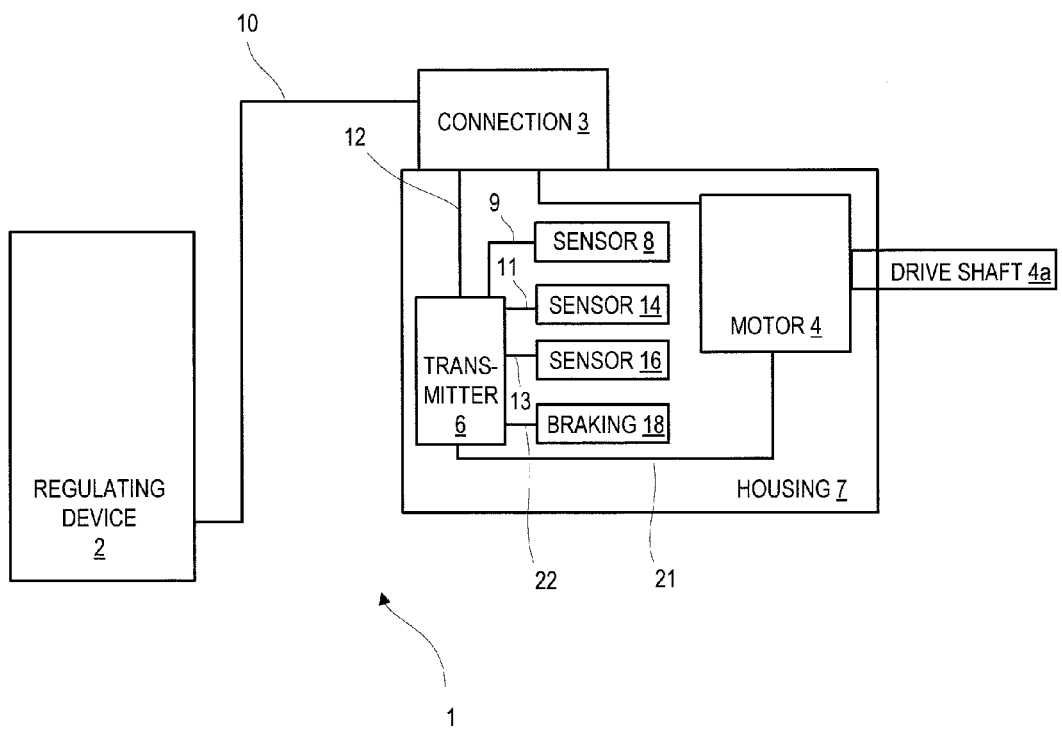
FIG. 2 shows a motor arrangement according to one embodiment.

FIG. 2 illustrates a motor arrangement 1 according to the invention. A transmitter device 6 assumes the function of a central control device. Transmitter device 6 may alternately or additionally be referred to herein as an encoder unit or feedback device. More precisely, sensor devices 8, 14, 16 are each connected to transmitter device 6 via sensor lines 9, 11, 13. Line 9 is for example a direct communication connection between sensor device 8 and transmitter device 6. In this manner the expenditure of cabling between transmitter device 6 and regulating/analysis device 2 is greatly simplified, leading to an elimination of a plurality of plugs and cables, or lines, respectively (e.g., between connection 3 and regulating/analysis device 2). Reference symbol 18 relates to a braking device, which also communicates with the transmitter device 6 via a connection line 22. Connection line 22 is for example a bi-directional line. An electric connection line or motor line 10 can therefore be embodied in a much simpler manner according to the invention, than according to prior art. More precisely, it is possible to include a power cable, a ground line, and also two control wires in motor line 10. Transmitter device 6 is connected to motor 4 via a connection line 21.

In this manner the present invention requires only one line connection (motor line 10) between regulating device 2 and motor 4. A processor device is located in transmitter device/feedback device 6, which detects the input signals of individual sensor devices 8, 14, 16, and of brake activation 18, and which forwards a respectively processed signal to regulating device 2. Said signal may be transmitted via motor line 10, or via one of the control wires within motor line 10. In response to said signals, regulating device 2 may in turn control motor 4, which is also carried out via motor line 10, or via one of the control wires within motor line 10. Reference symbol 12 denotes a connection line between transmitter device 6 and connection 3. Connection line 12 may also be a connection contact, particularly in case of very short distances.

Figure 3:
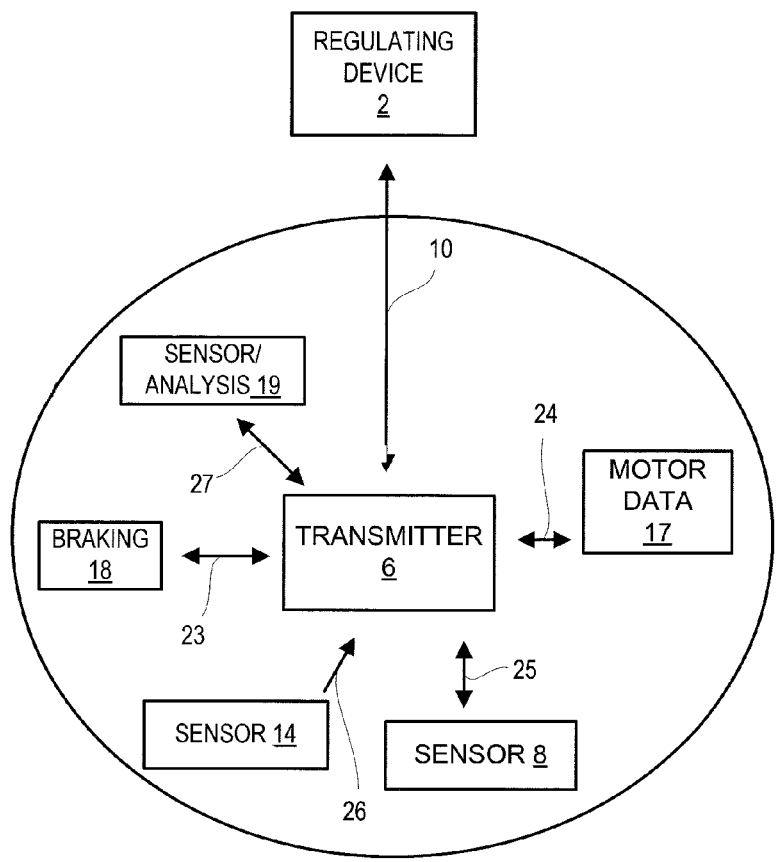
FIG. 3 illustrates a method of operation of a motor arrangement, according to an embodiment.

FIG. 3 shows a schematic illustration of the concept on which the invention is based. For this purpose, transmitter device 6, as the central control device, communicates with brake activation 18, for example, via a bi-directional connection line 23. Certain motor data 17, such as the position of the rotor, speed, or acceleration, may be forwarded to transmitter device 6 via a further bi-directional connection line 24.

Reference symbol 8 denotes a temperature sensor for sensing motor temperature. Temperature data may be transmitted to transmitter device 6 via a bi-directional connection line 25, however, it is also possible to transmit signals from the transmitter device to temperature sensor 8 so that the same may in turn have an influence on the operation of motor 4. For this purpose, multiple temperature sensors may also be utilized for monitoring motor 4, and the signals thereof may be analyzed.

Sensor device 14 may be a sensor or a plurality of further sensors, which transmit signals to encoder unit/transmitter device 6 via a non-directional connection 26. Reference symbol 19 denotes any optional further sensors or analysis devices, which may be used for controlling motor 4 and/or external devices. Data from sensor/analysis device or devices 19 may be transmitted to transmitter device 6 via a bi-directional connection line 27. Additionally, according to the invention, motor arrangement 1 may also include a memory device, which detects or records relevant motor data, such as a certain temperature, at a certain time.

Figure 4:
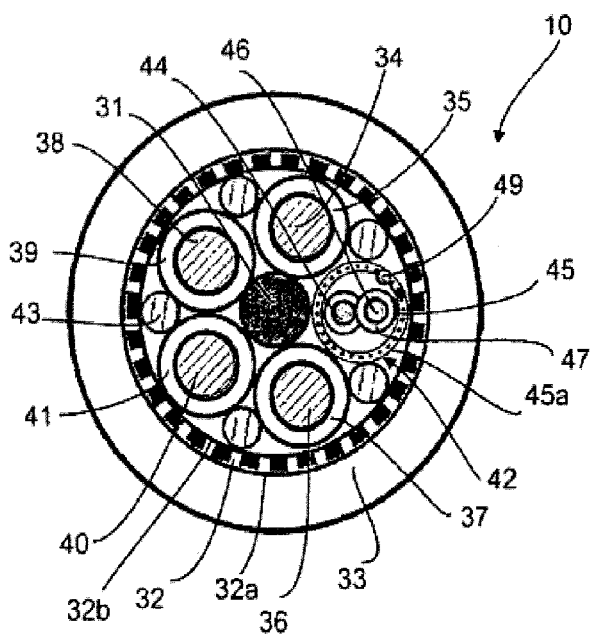
FIG. 4 shows a cross-section of an electric connection line for a motor arrangement, according to an embodiment.

FIG. 4 shows a greatly schematic cross-section of a line cable, such as of motor line 10 (hereinafter, also referred to as line cable 10), according to the invention. Three power lines 34, 36, 38 are provided within line cable 10 for supplying motor 4. Power lines 34, 36, 38 are surrounded by insulating sheathings 35, 37, 39, respectively. Reference symbol 40 denotes a ground line, which is also surrounded by a sheathing 41. In addition to power lines 34, 36, 38, line cable 10 also comprises a control line 42. Two control wires 44 and 46 being surrounded by a second shielding 45, preferably a metal shielding, such as a tin-plated copper braid, are located within control line 42. Second shielding 45 is surrounded by a Mylar film 45a, which has preferably been applied twice.

All lines are surrounded by a first, or exterior, shielding 32, which is preferably also a tin-plated copper braid. Reference symbols 32a and 32b denote bandings, which are attached to first shielding 32.

Reference symbol 33 denotes an exterior jacket of line cable 10. Reference symbol 31 denotes a core monofilament, and reference symbol 43 denotes further monofilaments, which are arranged between the individual lines.

Both control wires 44, 46 are each surrounded by an enveloping insulation/sheathing insulation 47, and are twisted.

Furthermore, a further (not illustrated) insulating sheathing may be provided between first shielding 32 and second shielding 45, which surrounds second shielding 45. For this purpose, said further insulating sheathing preferably has a non-circular profile such that it may be inserted into a respectively adapted coupling. This coding prevents an erroneous plugging of motor line 10 into the motor. Said further insulating sheathing in the insulating body may also ensure that the cable itself (e.g., line cable 10) is correctly connected to a plug. Most preferably the same (not illustrated) further insulating sheathing has a protrusion which protrudes toward the exterior or toward the interior, serving for coding purposes.

Reference symbol 49 denotes a PIN, or a contact location, respectively, by means of which second shielding 45 may also be connected to motor 4 (e.g., via connection 3). In this manner line cable 10 shown in FIG. 4 has a total of eight or nine PINs, or contacts, respectively, which are inserted into a respective coupling. In addition to power lines 34, 36, 38 and ground line 40, control wires 44, 46 also include connections, or PINs, respectively. A further connection is provided by PIN/contact location 49, and a final connection is first shielding 32 directly, which may lead, for example, to the housing of a metal plug.

Furthermore, it would also be possible to provide insulations/insulating sheathings 35, 37, or 39 with non-circular cross-sections, or coding, which prevent any erroneous plugging in of motor line 10. Sheathing insulation 47, however, may also have a different form from that shown in order to prevent an erroneous plugging in of the same.

All characteristics disclosed in the application are claimed as essential to the invention inasmuch as the same are novel as opposed to prior art either individually, or in combination.

LIST OF REFERENCE SYMBOLS 1 motor arrangement
2 regulating device, or regulating/analysis device
3 connection
4 motor
4a output shaft
5, 5a connection cable (prior art)
6 transmitter device
7 housing
8 sensor device, temperature sensor
9 sensor line, direct communication connection
10 motor line/electric connection line
11 sensor line
12 connection line
13 sensor line
14, 16 sensor device
18 braking device
19 further sensors
21 connection line
22, 24, 25 bi-directional connection line
26 non-directional connection
31 core monofilament
32 first shielding
32a, 32b banding
33 exterior jacket
34, 36, 38 power line
35, 37, 39 insulating sheathing
40 ground line
41 sheathing
43 control line
43 further monofilament
44, 46 control wire
45 second shielding
45a Mylar film
47 sheathing insulation
49 connection

The invention claimed is:
1. A motor arrangement (1) comprising:
a motor (4), on which a transmitter device (6) is arranged;
a regulating device (2) which is spatially separated from the motor, in communication with the motor (4) via at least one motor line (10), and controlling the movement of the motor, and
a plurality of sensor devices (8, 14, 16) which are arranged on the motor (4) and each directly connected to the transmitter device (6) via a respective sensor connection line (9, 11, 13), for detecting at least one physical property of the motor, and emitting a signal characterizing said physical property and transmitting the signal directly to the transmitter device (6), wherein the transmitter device (6) is connected to the regulating device (2), and transmits an output signal representative of the physical property to the regulating device (2);
wherein the motor line comprises:
an exterior shielding (32);
at least three power lines (34, 36, 38) extending within said exterior shielding, which are surrounded by an electrically insulating sheathing (35, 37, 39);
a ground line (40) extending within the exterior shielding (32), and
a control line (42) extending within the exterior shielding (32), the control line containing-two control wires (44, 46) arranged therein, the control wires (44, 46) being-surrounded by a second shielding (45);
wherein the second shielding (45) and the exterior shielding (32) are insulated against each other, and
wherein an electric contact device (49) is arranged on the second shielding (45) on at least one end of the motor line, which communicates with the second electric shielding in an electrically conducting manner.

2. The electric connection line according to claim 1, characterized in that the cross-section of at least one sheathing (35, 37, 39, 41, 47) is configured in an asymmetric manner at least on one end of the connection line.

3. The electric connection line according to claim 2, characterized in that the cross-section of at least one sheathing (35, 37, 39, 41, 47) comprises a protrusion that protrudes toward the exterior with regard to the sheathing.

4. A motor arrangement (1) comprising:
a motor (4), on which a transmitter device (6) is arranged;
a regulating device (2) spatially separated from the motor and in communication with the motor (4);
a motor line (10) connecting the regulating device (2) and the motor (4) to facilitate control of motor movement by the regulating device (2), the motor line including:
an exterior shielding (32);
at least three power lines (34, 36, 38) extending within the exterior shielding, each being surrounded by an electrically insulating sheathing (35, 37, 39);
a ground line (40); and
a control line (42) extending within the exterior shielding (32), the control line containing two control wires (44, 46), each surrounded by a second shielding (45), wherein the second shielding (45) and the exterior shielding (32) are insulated against each other, and
an electric contact device (49) arranged on the second shielding (45) on at least one end of the motor line, for communicating with the second electric shielding in an electrically conducting manner; and
at least one sensor device (8) arranged on the motor (4) and in direct communication (9) with the transmitter device (6), for detecting at least one physical property of the motor, emitting a signal characterizing said physical property and transmitting the signal directly to the transmitter device (6),
wherein the transmitter device (6) connects with the regulating device (2), and transmits an output signal representative of the physical property to the regulating device.

5. The motor arrangement according to claim 4, the transmitter device (6) comprising a processor for processing the characteristic signal from the sensor device and determining the representative output signal.

6. The motor arrangement according to claim 4, the at least one sensor device comprising a plurality of sensor devices (8, 14, 16), each directly connected to the transmitter device (6) via a respective sensor connection line (9, 11, 13).

7. The motor arrangement according to claim 6, wherein at least one of the plurality of sensor devices (8, 14, 16) communicates bi-directionally with the transmitter device (6).

8. The motor arrangement according to claim 4, the sensor device being selected from the group consisting essentially of: temperature sensor devices, position sensor devices, speed sensor devices, power sensor devices, acceleration sensor devices, combinations thereof, and the like.

9. The motor arrangement according to claim 4, further comprising a braking device (18) in communication with the transmitter device.

10. In a motor arrangement having a motor housed with a transmitter and at least one sensor, the improvement comprising:
a motor line (10) connecting the motor (4) with a regulating device (2), the motor line having:
an exterior shielding (32);
at least three power lines (34, 36, 38) extending within said exterior shielding, which are surrounded by an electrically insulating sheathing (35, 37, 39);
a ground line (40) extending within the exterior shielding (32), and
a control line (42) extending within the exterior shielding (32), the control line containing two control wires (44, 46) arranged therein, the control wires (44, 46) being surrounded by a second shielding (45);
wherein the second shielding (45) and the exterior shielding (32) are insulated against each other, and
wherein an electric contact device (49) is arranged on the second shielding (45) on at least one end of the motor line, which communicates with the second electric shielding in an electrically conducting manner.

* * * * *